Dec. 3, 1963    J. M. MORRIS    3,112,653
AMPLITUDE CONTROL OF CONSTANT SPEED VIBRATORY EQUIPMENT
Filed Nov. 28, 1958    3 Sheets-Sheet 1

INVENTOR.
JOHN M. MORRIS
BY
Marshall, Marshall & Yeasting
ATTORNEYS

Dec. 3, 1963 J. M. MORRIS 3,112,653
AMPLITUDE CONTROL OF CONSTANT SPEED VIBRATORY EQUIPMENT
Filed Nov. 28, 1958 3 Sheets-Sheet 3

INVENTOR.
JOHN M. MORRIS
BY
Marshall, Marshall & Yeasting
ATTORNEYS

United States Patent Office 3,112,653
Patented Dec. 3, 1963

3,112,653
AMPLITUDE CONTROL OF CONSTANT SPEED
VIBRATORY EQUIPMENT
John M. Morris, Louisville, Ky., assignor, by mesne assignments, to Chain Belt Company, Milwaukee, Wis., a corporation of Wisconsin
Filed Nov. 28, 1958, Ser. No. 777,110
16 Claims. (Cl. 74—61)

This invention relates to vibratory equipment and in particular to amplitude controls for vibratory systems employing constant speed, constant force vibration exciters.

Mechanical vibrations are used to perform useful work in many varied types of operations. One common use of mechanical vibration is the conveying of material which may include screening the material for size or otherwise treating it during the conveying operation. Other uses for vibratory equipment are in material processing by tumbling or ball milling, in compacting material, drilling and many similar applications.

While crank and connecting rod assemblies or electromagnetic drives consisting of electromagnets cooperating with armatures mounted on the work members may be employed to produce the vibrations, most heavy vibratory machines employ rotating unbalanced weights. Furthermore, in order to reduce the load on the bearings carrying the eccentric or unbalanced weights the systems are tuned so that the major portion of the accelerating and decelerating forces required to produce the vibration of the work member are provided by the supporting springs or by springs connecting an exciter mass to the work member. Such vibratory systems are very efficient in operation but suffer from the disadvantage that it is difficult to control the amplitude of vibration or to adjust the amplitude of vibration without stopping the equipment.

The principal object of this invention is to provide readily adjustable mechanism in the resilient coupling system between a work member and a vibration exciter which mechanism may be varied without varying the speed of the motor or adjusting the mass or eccentricity of the unbalanced weight.

Another object of the invention is to provide adjusting means in the resilient coupling mechanism between a vibratory work member and its vibration exciter such that the tuning or resonant characteristics of such coupling means and exciter may be varied without varying the speed of the motor or adjusting the eccentric weight carried in the exciter member.

A still further object of the invention is to provide a vibratory system including a vibration exciter with means for varying the effective spring rate of the resilient members coupling the exciter to the work member.

A still further object of the invention is to provide a vibratory system including a vibration exciter with resilient coupling members that include an expansible chamber the volume of which varies with the displacement of the exciter member relative to the work member and the contents of which may be varied during a stroke of vibration.

A still further object of the invention is to provide means for controlling the amount of elastic fluid in an expansible chamber connecting an exciter member to a work member so as to vary the resilient characteristics of the expansible chamber.

A still further object of the invention is to provide a vibratory system with a pair of expansible chambers serving at least as part of the coupling between a vibratory work member and its exciter member with means for controlling the flow of elastic fluid from one expansible chamber to the other as one member vibrates with respect to the other.

More specific objects and advantages are apparent from the following description of preferred embodiments of the invention.

According to the invention a vibratory system is provided in which an exciter member carrying a rotatable eccentric weight is coupled to a work member through resilient means that include a yieldable member and which may comprise an expansible chamber containing a quantity of fluid and control means are provided for regulating or controlling the yield of the yieldable member or the flow of fluid to or from the expansible chamber or chambers during vibratory operation of the system.

Preferred forms of the invention are illustrated in the accompanying drawings.

These specific figures and the accompanying description are intended merely to illustrate the invention and not to impose limitations on its scope.

Figure 7:
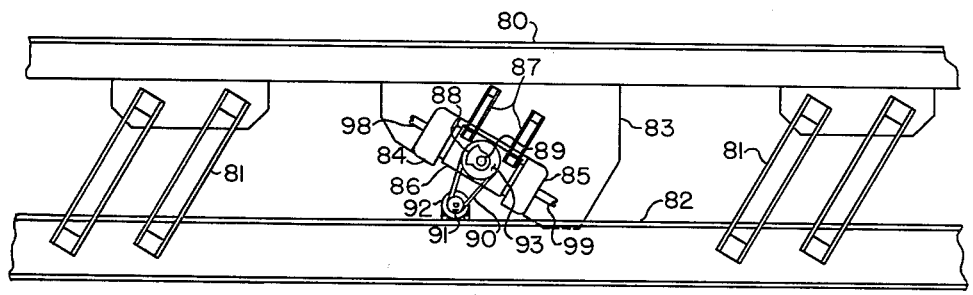
FIG. 7 is a side elevation showing still another form of coupling mechanism for coupling a vibration exciter to its work member.

Vibratory equipment that may be operated according to the invention is shown in FIGURE 7 of U.S. Patent No. 2,958,228 issued November 1, 1960.

According to the invention controllable resilient means are employed either in combination or in place of coil or other springs to provide the resilient force that cooperates with a work member and another mass to make a vibratory system. The controllable resilient means may have adjustable spring rates and may supply damping forces to limit the amplitude of the vibration. Thus in the structure shown in FIG. 1 a pair of expansible chambers 40 and 41 are provided to act in parallel with the springs 16. The actual construction comprises a cylinder 42 attached to the conveyor or work member 10 at the face 18, the cylinder having a piston 43 that is connected through a piston rod 44 to the exciter member 12. The chambers 40 and 41 are, preferably, at least partially gas-filled so that the compression of the gas in that chamber being compressed by the relative motion between the work member and the exciter exerts a force aiding the springs in resisting such compression while the other chamber is being expanded so as to have a reduced pressure that, in effect, aids the springs in resisting relative motion between the members from their static or rest position. Preferably a small clearance is provided between the walls of the piston 43 and the inside walls of the cylinder 42 so that the compressible material in the chambers may flow through a restricted space in amounts depending upon the speed of operation and the pressures developed in the chambers. This leakage of fluid, gas or liquid, from one chamber to another provides a damping effect which varies as a power of the amplitude of vibration thus introducing a minimum amount of damping for low amplitude of vibration and a large damping force for large amplitude of vibration thus providing a form of amplitude control. The piston rod, piston, and chambers provide a force transmission path that includes a resilient member, i.e. the expansible chamber and compressible material therein.

Figure 1:
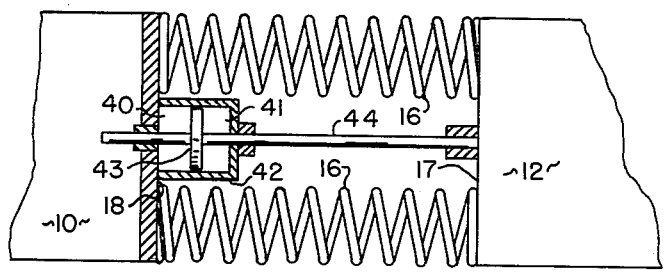
FIG. 1 is a plan view partly in section of a fragment of a tuned vibratory assembly to illustrate adjustable coupling means for coupling an exciter member to a work member.
Figure 2:
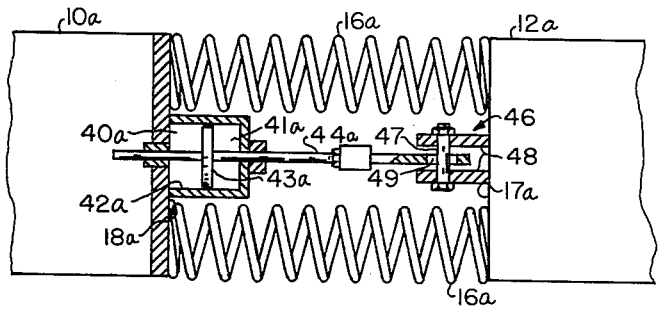
FIG. 2 is a similar view of a fragment of a mechanism showing another form of coupling mechanism.

FIG. 2 shows a structure somewhat similar to FIG. 1. In this structure coupling springs 16a connect an exciter member 12a to a conveyor or work member 10a. Expansible chambers 40a and 41a are provided in a cylindrical body 42a on opposite sides of a piston 43a that is connected through a piston rod 44a to the exciter member 12a. In contrast to the structure of FIG. 1 a lost motion connection 46 is provided which may be in the form of a transverse pin 47 carried in brackets 48 attached to the exciter member 12a and engaged in a slot 49 in the end of the piston rod 44a. This arrangement functions somewhat similar to that shown in FIG. 1 except that the difference between the damping at low amplitudes and the damping at high amplitudes of vibration is increased by the lost motion connection. The lost motion permits free relative motion of the members within the limits of the lost motion connection and only applies the resilient and damping effect of the expansible chambers 40a and 41a when the amplitude exceeds the limits of the lost motion.

Figure 3:
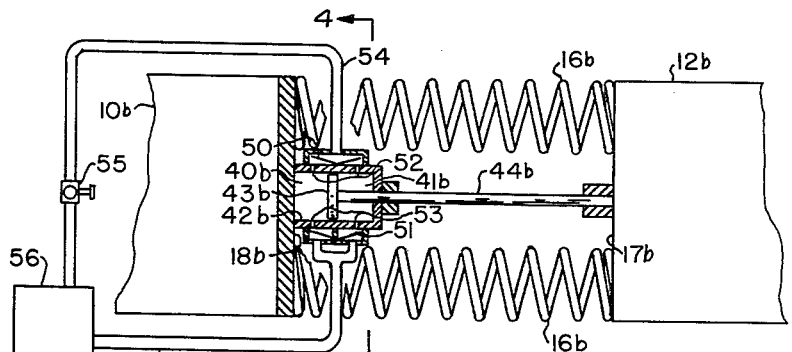
FIG. 3 shows another form of coupling mechanism and means for controlling the characteristic of the coupling mechanism during operation of the assembly.
Figure 4:
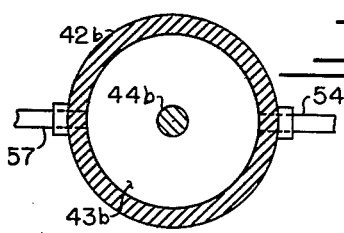
FIG. 4 is an enlarged cross-sectional view as seen from the line 4—4 of FIG. 3.

In the arrangements shown in FIGS. 1 and 2 the expansible chambers 40 and 41 or 40a and 41a serve to contribute to the resilient coupling between the work member and the exciter member and to supply a certain amount of damping which is not adjustable while the system is in operation. If additional control is added to control the flow of fluid whether it be compressible or not from one chamber to the other, control may be had of the amplitude of vibration of the system. Such control may be of a form that is easily adjustable while the system is in operation. FIGS. 3 and 4 illustrate one possible form of such additional control.

In this arrangement as shown in FIG. 3, the work member 10b is connected to an exciter member 12b by means of coupling springs 16b and an arrangement comprising a pair of expansible chambers 40b and 41b that are separated by a piston 43b that is connected through a piston rod 44b to the exciter member 12b. The piston 43b is made a close fit in the cylinder 42b and check valves 50 and 51 are provided over ports 52 and 53 in the cylinder walls so that the expansible chambers operate as a pump to pump the fluid from the chambers into a discharge line 54 that leads through a back pressure valve 55 to a reservoir 56. A suction line 57 from the reservoir leads through the check valves 51 and ports 53 into the expansible chambers 40b and 41b. In this arrangement the discharge pipe 54, valve 55, reservoir 56 and suction pipe 57 serve in the nature of a by-pass or closed circuit system for connecting the expansible chambers 40b and 41b.

When the valve 55 is closed or set for a high back pressure and the system including the reservoir 56 and the chambers 40b and 41b is charged with air or other compressible fluid the expansible chambers serve as resilient means or springs acting through the piston 43b and piston rod 44b to assist the springs 16b in forming the resilient elements of the system that resiliently resist changes in spacing of the exciter member 12b from its static position with respect to the work member 10b. Since the spring force of the expansible fluid, air or other gas, contained in the expansible chambers varies with the absolute pressure of the fluid as well as the compression or expansion produced by the relative motion of the piston 43b with respect to the cylinder it is possible to vary the spring rate of the expansible chambers by varying the average pressure in the chambers. Automatic control of the maximum amplitude of vibration is achieved by setting the back pressure valve 55 to permit gas flow through the valve when certain pressures are exceeded. Thus with the back pressure valve 55 set for a certain pressure it determines the pressure difference between the pressure above the check valves 50 and the pressure below the check valves 51. Therefore, if the amplitude of vibration tends to exceed a certain preset amplitude fluid will be forced out through the ports 52 and past the check valves 50 as each chamber reaches its minimum volume and corresponding amounts of fluid may be admitted through the valves 51 and ports 53 to the expanded chamber. Thus the chambers act as a pump or double acting compressor with a limited energy storage capacity as far as aiding the springs 16b and serves as an energy sink or energy absorbing device as soon as the amplitude exceeds a certain amount. Thus the adjustment of the valve 55 may be used to set the operating amplitude of vibration by extracting substantial amounts of energy from the system as soon as it tends to vibrate at amplitudes greater than the selected amplitude.

The systems so far described are similar to those disclosed in United States application Serial No. 673,416, filed July 22, 1957 of which this is a continuation-in-part.

The arrangement shown in FIG. 3 is functionally equivalent to an ordinary spring that is rigidly connected to one of the members, either the work member 10b or the exciter member 12b, and which is connected to the other member through a friction joint that can slide or yield whenever the force in either direction exceeds a certain amount. Thus the chambers act as ordinary springs until the pressure in the chamber exceeds the pressure in outlet pipe 54 or is less than the pressure in the inlet pipe 57. As soon as this pressure is exceeded some of the gas is forced through the check valves and the valves, by preventing the return flow, reduce the force with which the expansible chamber acts on the members during the return stroke. Thus this is equivalent to allowing the end of a spring to frictionally yield in its connection to one of the members.

Figure 5:
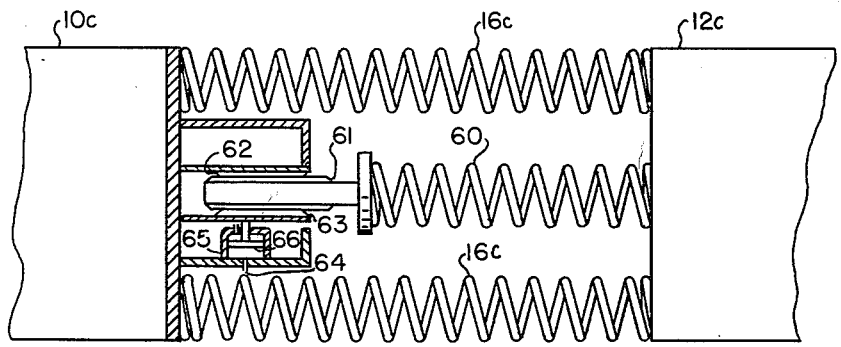
FIG. 5 is a fragmentary view, partly in section, of still another form of coupling mechanism operating as the connection means between a work member and a vibration exciting member.
Figure 6:
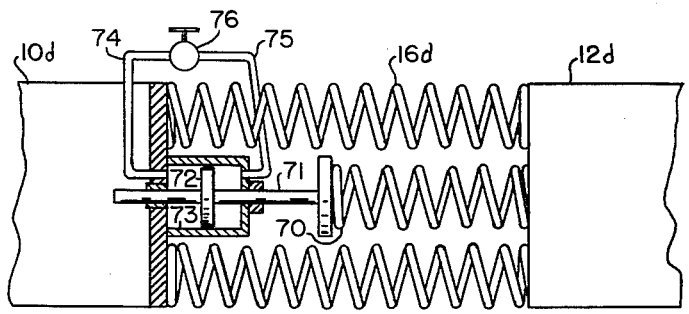
FIG. 6 is a view similar to FIG. 5 showing still another form of coupling control means.

Other structures employing this principle of operation are illustrated in FIGS. 5, 6, 7 and 8. Two such systems or arrangements embodying the same principle of operation as that shown in FIG. 3 are shown in FIGS. 5 and 6. In the structure illustrated in FIG. 5 a pair of coupling springs 16c connect an exciter member 12c to a work member 10c. In parallel with these coupling springs a third spring 60 is rigidly connected to the exciter member 12c and to a slidable friction plate 61 that is frictionally clamped between a fixed brake shoe 62 and a movable brake shoe 63 mounted on the work member 10c. The movable brake shoe 63 is urged into frictional engagement by hydraulic pressure admitted through a line 64 to a cylinder 65 having a piston 66 that bears against the movable brake shoe 63. As long as the amplitude of vibration of the exciter member 12c with respect to the work member 10c is less than a certain amplitude the force transmitted through the spring 60 is not sufficient to overcome the friction in the brake and the brake acts as a solid connection for the spring. Any increase in amplitude of vibration beyond such an amount or such amplitude results in sufficient extension or compression of the spring 60 to produce a sliding motion between the plate 61 and the brake shoes 62 and 63. This motion, by relaxing the spring, reduces the amount of force with which the spring 60 tends to return the exciter member toward the center of its stroke and by changing the effective position of the brake end of the spring 60 advances the point at which the spring 60 starts to resist movement away from the central position on the next half cycle of vibration. This slipping of the brake plate occurs near each end of the stroke of the vibration as the spring forces reach their maximum values. This sliding motion introduces enough energy loss in the system to limit the amplitude of vibration and at the same time detune the system to decrease the amplification obtained by operating near resonance.

A generally similar arrangement for yieldably supporting one end of the coupling spring is illustrated in FIG. 6. In this arrangement coupling springs 16d are interposed between and connect an exciter member 12d and a work member 10d. A third spring 70 also connetced to the exciter member 12d in parallel with the springs 16d is connected through a piston rod 71 to a piston 72 that operates within a chamber or cylinder 73. The chamber 73 is preferably filled with liquid rather than expansible gas so as to afford a relatively solid connection or support for the end of the spring 70. To permit yielding of the spring a by-pass circuit including pipes 74 and 75 connected through a valve 76 is arranged to permit liquid to flow from one side of the piston to the other. The amount of flow is regulated by the valve 76.

In this arrangement the minimum damping for maximum amplitude is obtained when the valve 76 is closed tightly so that the piston 72 is relatively immovable in the cylinder 73. Under this condition the spring 70 is effectively in parallel with the spring 16d and its deflection corresponds to the deflection of the other springs. When it is desired to introduce damping to limit the amplitude of vibration the valve 76 is partially opened and as it is opened the piston 72 moves in the cylinder in amounts that depend upon the force transmitted through the spring. Thus for large amplitudes of vibration the piston 72 may pump substantial quantities of liquid through the by-pass arrangement thereby permitting the supported end of the spring 70 to yield in corresponding amounts. This yielding movement occurring while force is being transmitted extracts energy from the vibrating system. The valve 76 thus provides an easy means of adjustment for regulating the amplitude of vibration produced by the exciter member 12d under the influence of its rotating eccentric weight.

In these embodiments the spring and brake or spring and dashpot form a force transmission path that includes both a resilient portion or means and a yieldable portion or means.

Figure 8:
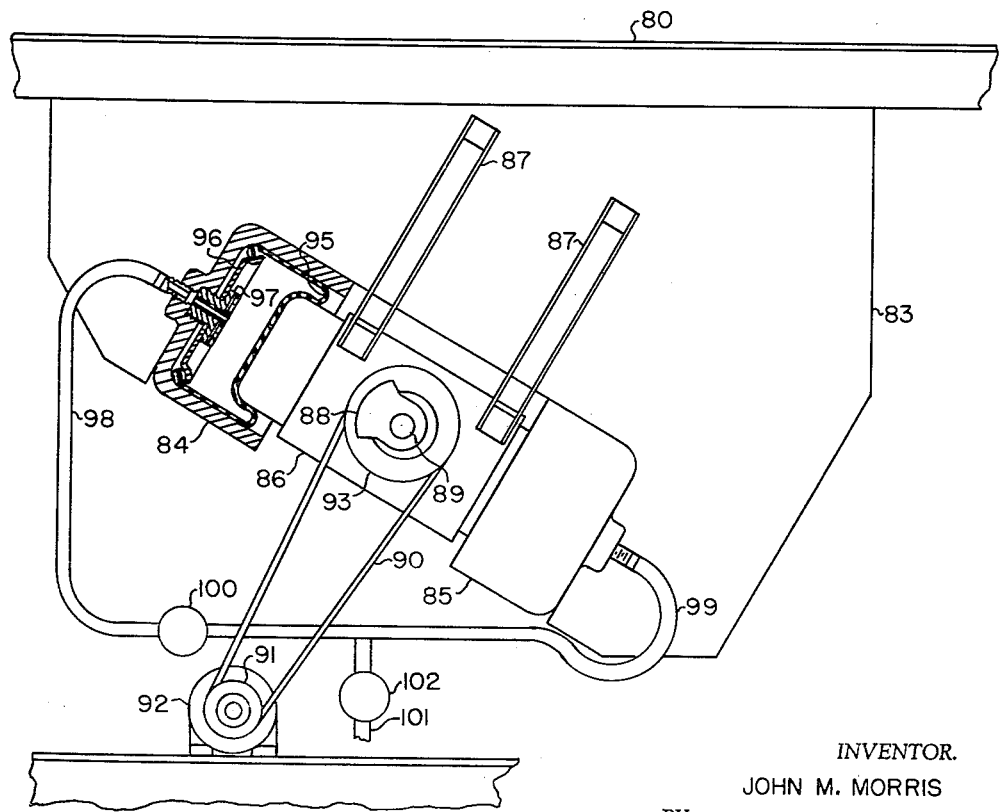
FIG. 8 is an enlarged view partly in section of the resilient coupling mechanism illustrated in FIG. 7.

Still another arrangement of controllable resilient coupling between an exciter member and a vibratory work member is illustrated in FIGS. 7 and 8. In this arrangement a conveyor trough 80 constituting a work member is guided for vibratory movement by a plurality of leaf springs 81 connected to a base 82. The leaf springs 81 are arranged in pairs and are inclined to the axis of the conveyor 80 so as to force the conveyor to vibrate along a rectilinear path that is inclined to the length of the conveyor. A downwardly directed bracket 83 attached to the conveyor 80 supports a pair of cup-shaped cylindrical housings 84 and 85 in spaced apart facing relation. Intermediate between the housings an exciter mass 86 is positioned and guided by parallel leaf springs 87 extending upwardly from the exciter mass 86 to the downwardly depending bracket 83. An eccentric weight 88 is carried on a rotatable shaft 89 journaled in the exciter member 86 and is driven by a belt 90 trained over a drive pulley 91 of a drive motor 92 and a driven pulley 93 on the shaft 89.

Gas-filled expansible chambers in the cylindrical cup-shaped housings 84 and 85 engage the ends of the exciter member 86 to form a vibratory system having a natural or resonant frequency at or near the desired operating speed of the conveyor. Each of the expansible chambers includes a flexible airtight sack or bag 95 the rim of which is sealed under a clamping plate 96 at the closed end of the cup-shaped housing 84 or 85 and the other end of the bag 95 is draped over the adjacent end of the exciter member 86. The bags 95 are made deep enough to extend into the space between the side walls of the cup-shaped housings 84 and 85 and the radially adjacent portions of the exciter member 86 over which the bag is draped. The relative movement between the exciter member 86 and the bracket 83 causes the flexible side walls of the bags 95 to roll back and forth in the radial space between the ends of the exciter member and the adjacent side walls of the housings. This provides a substantially friction-free seal between the moving exciter member 86 and the cup-shaped housings 84, 85 that takes the place of the sliding seal between the piston and cylinder as indicated in the previous examples.

The sealing or locking plate 96, holding the rim of the flexible bag 95, is preferably secured by a large-headed, hollow-stemmed bolt 97 that passes through an opening in the locking plate 96 and is threaded into the end of the cup-shaped housing. The bore through the stem of the bolt 97 is noncircular in form, preferably hexagonal, to receive a wrench to allow the bolt to be turned to tighten it in place in the housing.

The air chambers formed in the air bags 95 constitute expansible chambers and are interconnected by tubes 98, 99 and a valve 100 to control the flow of air or other elastic or compressible gas from one of the chambers to the other. They also may be connected through a second tube 101 and valve 102 to a source of gas under pressure by which the system may be charged to any desired operating pressure.

In this arrangement the gas-filled chambers in the cup-shaped housings 84 and 85 serve as resilient means that cooperate with the mass of the exciter member 86 to form a tuned vibratory system having a natural frequency substantially at the desired operating speed of the conveyor 80. With the valve 100 closed there is no interchange of gas from one chamber to the other and the chambers act as perfect springs having a spring rate that is determined by their cross-sectional area and the pressure of the gas in the chambers. In the design of the system, the initial volume of each of the chambers and the compression ratio is selected to provide at reasonable gas pressure the required spring rate for oscillatory movement of the exciter member 86. Thus if the exciter member is to operate with a short stroke and fairly high frequency it is desirable that the volume of the expansible chambers be comparatively small.

The principle of controlling the energy loss in the system by allowing a support for a spring to slip against a friction force can also be applied to the air springs, the gas chambers in the housings 84 and 85 by slightly opening the valve 100 so as to permit gas to flow from one chamber to the other. Thus, in the example shown in FIG. 8, if the exciter member is moving upwardly toward the left so as to compress the chamber 95 in the housing 84 gas will be pushed through the tube 98 and valve 100 into the chamber within the cup-shaped housing 85. This gas flowing against the restriction of the valve 100 corresponds for example to the movement of the brake plate 61 in FIG. 5 between the brake shoes 62 and 63. The result of the gas flow through the valve 100 in the first direction as the chamber in the housing 84 is compressed corresponds to moving the static position or the neutral position of the exciter member 86 upwardly toward the left. On the next half-cycle of the oscillation as the exciter member moves downwardly toward the right the gas is pushed back through the valve 100 in the opposite direction. This flow of gas from one chamber to the other through the restriction of the valve 100 has the effect of slightly decreasing the apparent spring rate of the chambers and introducing sufficient damping to limit the amplitude of vibration and reduce it from the undamped amplitude of vibration.

For this control to be effective it is desirable that the operating speed and the natural period of the system be selected so that the operating speed is slightly higher or lower than the actual resonant frequency of the system. In this condition introduction of damping by changing the magnification of the system may be employed as the principal means of changing amplitude. The corresponding change in spring rate, which is small for small openings of valve 100, becomes increasingly effective as the valve is opened wider. When the valve is fully opened the system exhibits practically no spring rate except for the inertia of the air in the tubing because there is no way to build up pressure in one chamber over the pressure in the other and there is no effective change in cross-sectional area with deflection.

The flexible side-walled expansible chambers in the housings 84 and 85 and valve 100 thus provide a force transmission system that includes resilient means, the compression or expansion of gas, and yieldable means, the flow through the valve 100, for the vibratory system, makes possible an easy method of adjusting both the tuning and the damping in the system for control of the amplitude of vibration.

Various modifications may be made in the various details of construction in the various embodiments of the invention without departing from the spirit and scope of the invention.

Having described the invention, I claim:

1. In apparatus for doing work by vibration, in combination, a member to be vibrated, an eccentric weight rotatably mounted on said member, drive means connected to said weight for rotating said eccentric weight at a constant speed to apply a vibratory force at substantially constant amplitude to the member, a second member, resilient means connecting said members and forming with the members a vibratory system having a natural frequency generally equal to said constant speed, said resilient means including at least one expansible chamber the volume of which varies with relative displacement of the members and which applies substantial spring force to the members, fluid in the chamber at least some of which is gaseous, a port in the chamber, and an adjustable restriction connected to the port and arranged to restrict the flow of fluid to and from the chamber as the members vibrate.

2. In apparatus for doing work by vibration, in combination, a member to be vibrated, an eccentric weight rotatably mounted on said member, means operatively connected to said weight for rotating the weight at a constant speed to apply a vibratory force at substantially constant amplitude to the member, a second member, resilient means connecting said members and forming with said members a vibratory system having a natural frequency generally equal to said constant speed, said resilient means including at least one expansible chamber applying substantial spring force to the members and having a volume which varies with relative movements of the members, a second chamber in communication with the first chamber, a gaseous fluid filling at least a portion of each chamber, and an adjustable flow controlling restriction connected to said chambers and arranged to control the flow of fluid between said chambers as the volume of the expansible chamber varies with the relative movements of said members.

3. An apparatus according to claim 2 in which the second chamber is an expansible chamber included in said resilient means and arranged to act in opposition to the first mentioned chamber.

4. An apparatus according to claim 2 in which the expansible chamber and elastic fluid therein provide at least half of the force of the resilient means supporting the vibratory member.

5. In apparatus for doing work by vibration, in combination, a member to be vibrated, a rotating eccentric weight journaled in said member, means connected to said weight for driving the weight at a substantially constant speed, a second member, resilient means connecting the members and cooperating with the members to form a vibratory system having a natural frequency generally equal to said constant speed, said resilient means including an expansible chamber the volume of which changes with displacement of the member, an elastic fluid within the chamber, said chamber and fluid providing at least half the resilient force of the resilient means, said expansible chamber having a port, and adjustable flow control means connected to said port for controlling the flow of fluid through the port.

6. In apparatus for doing work by vibration, in combination, a member to be vibrated, means connected to said member for applying a vibratory force to said member at a substantially constant frequency and amplitude, a support, resilient means connecting the member to the support and cooperating with the member to form a vibratory system having a natural frequency generally equal to said constant frequency, said resilient means including an elastic portion and a yieldable portion effectively in series to provide a force transmission path, and adjusting means operably connected to the yieldable portion.

7. In apparatus for doing work by vibration, in combination, a member to be vibrated, means connected to said member for applying a vibratory force to said member at a substantially constant frequency and amplitude, a support, resilient means connecting the member to the support and cooperating with the member to form a vibratory system having a natural frequency generally equal to said constant frequency, said resilient means including an elastic portion and a frictionally yieldable portion effectively in series to provide at least one resilient force transmission path.

8. In apparatus for doing work by vibration, in combination, a member to be vibrated, means connected to the member for applying a vibratory force to said member at a substantially constant frequency and amplitude, a support, resilient means connecting the member to the support and cooperating with the member to form a vibratory system having a natural frequency generally equal to said constant frequency, said resilient means including an elastic portion and a friction damping portion effectively in series to provide a resilient force transmission path, and adjusting means connected to the damping portion to adjust the amplitude of vibration of the member.

9. In an apparatus for doing work by vibration, in combination, a member to be vibrated, means connected to said member for applying a vibratory force to said member at a substantially constant frequency and amplitude, a support, resilient means connecting the member to the support and cooperating with the member to form a vibratory system having a natural frequency generally equal to said constant frequency, said resilient means including an elastic portion and a viscous friction damping portion effectively in series to provide a resilient force transmission path, and adjusting means connected to the friction damping portion to vary the amplitude of vibration of the member.

10. In an apparatus for doing work by vibration, in combination, a member to be vibrated, means connected to said member for applying a vibratory force to said member at a substantially constant frequency and amplitude, a support, resilient means connecting the member to the support and cooperating with the member to form a vibratory system having a natural frequency generally equal to said constant frequency, said resilient means including an expansible chamber, a second chamber in communication with the first, an elastic fluid contained in the chambers, and adjustable means operatively connected to said chambers to restrict the flow of fluid from one chamber to the other.

11. In an apparatus for doing work by vibration, in combination, a member to be vibrated, means connected to said member for applying a constant frequency vibratory force to said member, a support, resilient means connecting the member to the support and cooperating with the member to form a vibratory system having a natural frequency generally equal to said constant frequency, said resilient means including at least one pair of expansible chambers one of which expands as the other contracts, a gaseous fluid in each of said chambers, a passage connecting the chambers, and adjustable means connected in said passage for restricting the flow of fluid through the passage.

12. In an apparatus for doing work by vibration, in combination, a member to be vibrated, means connected to the member for applying a constant frequency vibratory force to said member, a support member, resilient means connecting the members and cooperating with the members to from a vibratory system having a natural frequency generally equal to said constant frequency, said resilient means including in series an expansible chamber and a spring for transmitting force from one of the members to the chamber, a second chamber communicating with the expansible chamber, a fluid filling at least the expansible chamber, and adjustable means operably connected to the chamber for regulating the flow of fluid to and from the expansible chamber.

13. In an apparatus for doing work by vibration, in combination, a member to be vibrated, an eccentric weight rotatably mounted on the member, means operatively connected to the weight for driving the weight at a generally constant speed for applying a substantially constant vibratory force to the member, a second member, resilient means including a spring interconnecting the members and forming with the members a vibratory system having a natural frequency generally equal to said constant speed, and means operably connected to the spring for varying the force exerted by said spring at a particular relative positioning of said members in accordance with the amplitude of vibration of said members.

14. In an apparatus for doing work by vibration, in combination, a member to be vibrated, a second member, an eccentric weight rotatably mounted on one of the members, means operatively connected to the weight for driving the weight at a substantially constant speed for applying a substantially constant vibratory force to the member, resilient means including a spring interconnecting the members and forming with the members a vibratory system having a natural frequency generally equal to said constant speed, and means operably connected to the spring for varying the force exerted by said spring at a particular spacing of said members according to the amplitude of vibration of said members.

15. In an apparatus for doing work by vibration, in combination, a member to be vibrated, a second member, an eccentric weight rotatably mounted on one of the members, means operatively connected to said weight to drive said weight at a substantially constant speed for applying a substantially constant vibratory force to the member, resilient means including at least one spring of solid elastic material connecting said members and cooperating with the members to form a vibratory system having a natural frequency generally equal to said constant speed, and frictionally yieldable means connecting one end of said spring to the adjacent one of said members.

16. In an apparatus for doing work by vibration, in combination, a member to be vibrated, a second member, an eccentric weight rotatably mounted on one of the members, means operatively connected to the weight for driving the weight at a substantially constant speed for applying a substantially constant vibratory force to the member, resilient means including an air spring coupling the members and cooperating with the members to form a vibratory system having a natural frequency substantially equal to the operating speed of the weight, an air chamber connected to the air spring, and an adjustable restriction in the connection between the air spring and the air chamber.

References Cited in the file of this patent

UNITED STATES PATENTS

| | | |
|---|---|---|
| 989,958 | Frahm | Apr. 18, 1911 |
| 2,353,492 | O'Connor | July 11, 1944 |
| 2,380,013 | Bankauf | July 10, 1945 |
| 2,541,112 | Smith | Feb. 13, 1951 |
| 2,636,719 | O'Connor | Apr. 28, 1953 |
| 2,647,591 | Young | Aug. 4, 1953 |
| 2,777,544 | O'Connor | Jan. 16, 1957 |
| 2,828,014 | Wantling | Mar. 25, 1958 |

FOREIGN PATENTS

| | | |
|---|---|---|
| 884,121 | Germany | Aug. 31, 1953 |